United States Patent
Chazen et al.

(10) Patent No.: US 12,375,923 B1
(45) Date of Patent: *Jul. 29, 2025

(54) DYNAMIC DETECTION FOR MOBILE DEVICE SECURITY

(71) Applicant: Zimperium, Inc., Dallas, TX (US)

(72) Inventors: Ryan Chazen, South Africa (ZA); Asaf Peleg, Kadima-Zoran (IL)

(73) Assignee: Zimperium, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,423

(22) Filed: Apr. 30, 2024

Related U.S. Application Data (63) Continuation of application No. 17/316,561, filed on May 10, 2021, now Pat. No. 12,010,517.

(51) Int. Cl.
*H04W 12/121* (2021.01)
(52) U.S. Cl.
CPC .................................. *H04W 12/121* (2021.01)
(58) Field of Classification Search
CPC ............. H04W 12/121; H04W 12/065; H04L 63/1483; H04L 63/145; H04L 63/1433
See application file for complete search history.

(56) References Cited

U.S. PATENT DOCUMENTS

| | | | |
|---|---|---|---|
| 6,105,136 A | 8/2000 | Cromer et al. | |
| 7,409,717 B1 | 8/2008 | Szor | |
| 7,890,089 B1 | 2/2011 | Fujisaki | |
| 9,158,915 B1 | 10/2015 | Yumer et al. | |
| 9,223,997 B2 | 12/2015 | Adams | |
| 9,226,145 B1 * | 12/2015 | Loman | H04W 12/35 |
| RE46,768 E | 3/2018 | Hering et al. | |
| 10,176,329 B2 | 1/2019 | Chen et al. | |
| 10,277,621 B2 | 4/2019 | Vervier et al. | |
| 11,205,233 B1 | 12/2021 | Callahan | |
| 11,275,570 B1 * | 3/2022 | Collins | G06F 8/427 |
| 11,507,671 B1 | 11/2022 | Moritz et al. | |
| 11,528,292 B1 | 12/2022 | Thanos | |
| 11,775,636 B1 * | 10/2023 | Neel | G06F 21/554 726/24 |
| 11,803,792 B2 * | 10/2023 | Makhija | G06Q 10/08 |
| 12,047,402 B2 * | 7/2024 | Kakizaki | H04L 63/1425 |

(Continued)

OTHER PUBLICATIONS

United States Office Action, U.S. Appl. No. 17/316,561, filed Dec. 5, 2022, 12 pages.

(Continued)

*Primary Examiner* — Khalid M Almaghayreh
(74) *Attorney, Agent, or Firm* — Fenwick & West LLP (57) ABSTRACT

System and methods are disclosed herein for dynamic detection of malicious activities on a mobile device. The mobile device maintains a file that is executable on the mobile device. The file includes a plurality of primitives, with each primitive comprising a piece of detection logic that, when executed, performs a security function on the mobile device. The mobile device receives instructions from a security service to chain a subset of primitives. The subset of primitives, when chained together, forms a detection process for a malicious activity newly identified by the security service. The system and methods then chain the subset of primitives based on instructions received from the security service and identify the malicious activity by executing the chained subset of primitives.

20 Claims, 6 Drawing Sheets

(56) References Cited

U.S. PATENT DOCUMENTS

| | | | |
|---|---|---|---|
| 12,147,145 B2 * | 11/2024 | Goun | G01S 7/41 |
| 2004/0236843 A1 | 11/2004 | Wing et al. | |
| 2004/0268145 A1 | 12/2004 | Watkins et al. | |
| 2005/0278777 A1 | 12/2005 | Loza | |
| 2013/0061325 A1 | 3/2013 | Singh et al. | |
| 2013/0117769 A1 * | 5/2013 | Sharma | G06F 1/3293 |
| | | | 713/320 |
| 2013/0152202 A1 | 6/2013 | Pak et al. | |
| 2016/0226905 A1 | 8/2016 | Baikalov et al. | |
| 2018/0192292 A1 | 7/2018 | Coney | |
| 2018/0253558 A1 * | 9/2018 | Li | H04L 63/1433 |
| 2020/0329071 A1 | 10/2020 | Dani et al. | |
| 2023/0282340 A1 * | 9/2023 | Johnson | G06F 16/285 |
| | | | 705/2 |
| 2024/0086530 A1 * | 3/2024 | Klonowski | G06F 11/3466 |
| 2024/0154977 A1 * | 5/2024 | Moore | H04L 63/1425 |

OTHER PUBLICATIONS

United States Office Action, U.S. Appl. No. 17/316,561, filed Jul. 31, 2023, 13 pages.

* cited by examiner

DYNAMIC DETECTION FOR MOBILE DEVICE SECURITY

CROSS-REFERENCE TO RELATED APPLICATIONS

The present application is a Continuation of U.S. application Ser. No. 17/316,561, filed May 10, 2021, which is hereby incorporated by reference herein in its entirety.

TECHNICAL FIELD

The disclosure generally relates to the field of mobile device security, and more particularly relates to dynamic detection of malicious activities on mobile devices.

BACKGROUND

Mobile devices operating mobile applications are prone to threats from various sources such as malicious websites, malicious applications, microphone/camera hijacking, entry point to network vulnerabilities, and attacks targeting against operating systems, etc. When a new malicious threat is identified, to apply a new detection process for the newly identified threat by a threat prevention service, an update to a respective mobile application is often required. However, updating a mobile application does not happen in real time, often taking several weeks to perform, and thus risks a substantial time gap between when the threat is identified and when the new detection process is applied. The time gap may make the mobile device vulnerable to potential risks.

SUMMARY

Systems and methods are disclosed herein for dynamic detection of malicious activities on a mobile device. The mobile device maintains a file that is executable on the mobile device. The file includes a plurality of primitives, with each primitive comprising a piece of detection logic that, when executed, performs a security function on the mobile device. The mobile device receives instructions from a security service to chain a subset of primitives. The subset of primitives, when chained together, forms a detection process for a malicious activity newly identified by the security service. A malicious activity may be any kind of potential risk (such as risk from malware or attacks) that the mobile device is vulnerable to. The systems and methods then chain the subset of primitives based on instructions received from the security service and identify the malicious activity by executing the chained subset of primitives.

The systems and methods disclosed herein provide various technical advantages. For example, when a new vulnerability is identified and a new detection process needs deployment, the system and methods disclosed herein may reduce the delay resulting from updating the respective application, which is accomplished by maintaining a primitive repository on the mobile device. The mobile device may receive instructions from a security service to chain primitives to form a complicated detection process for detecting the new vulnerability. As the primitives stored on the mobile device are already reviewed by a third-party platform that distributes and manages mobile applications (e.g. Google Play App Store), the systems and methods disclosed herein may form a holistic detection process by chaining primitives without having to compensate device security because of the delay caused by application update. Furthermore, the systems and methods disclosed herein may provide stability to detection by attaching resource files such as classifiers with respective instructions. Attaching classifiers with instructions ensures that the instructions are executed with compatible classifiers and therefore provides stability in the detection process. Yet further, the systems and methods disclosed herein may dynamically cache information that is reusable for future detection processes which saves computing power and battery energy for mobile devices.

The features and advantages described in this summary and the following detailed description are not all-inclusive. Many additional features and advantages will be apparent to one of ordinary skill in the art in view of the drawings, specification, and claims hereof.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
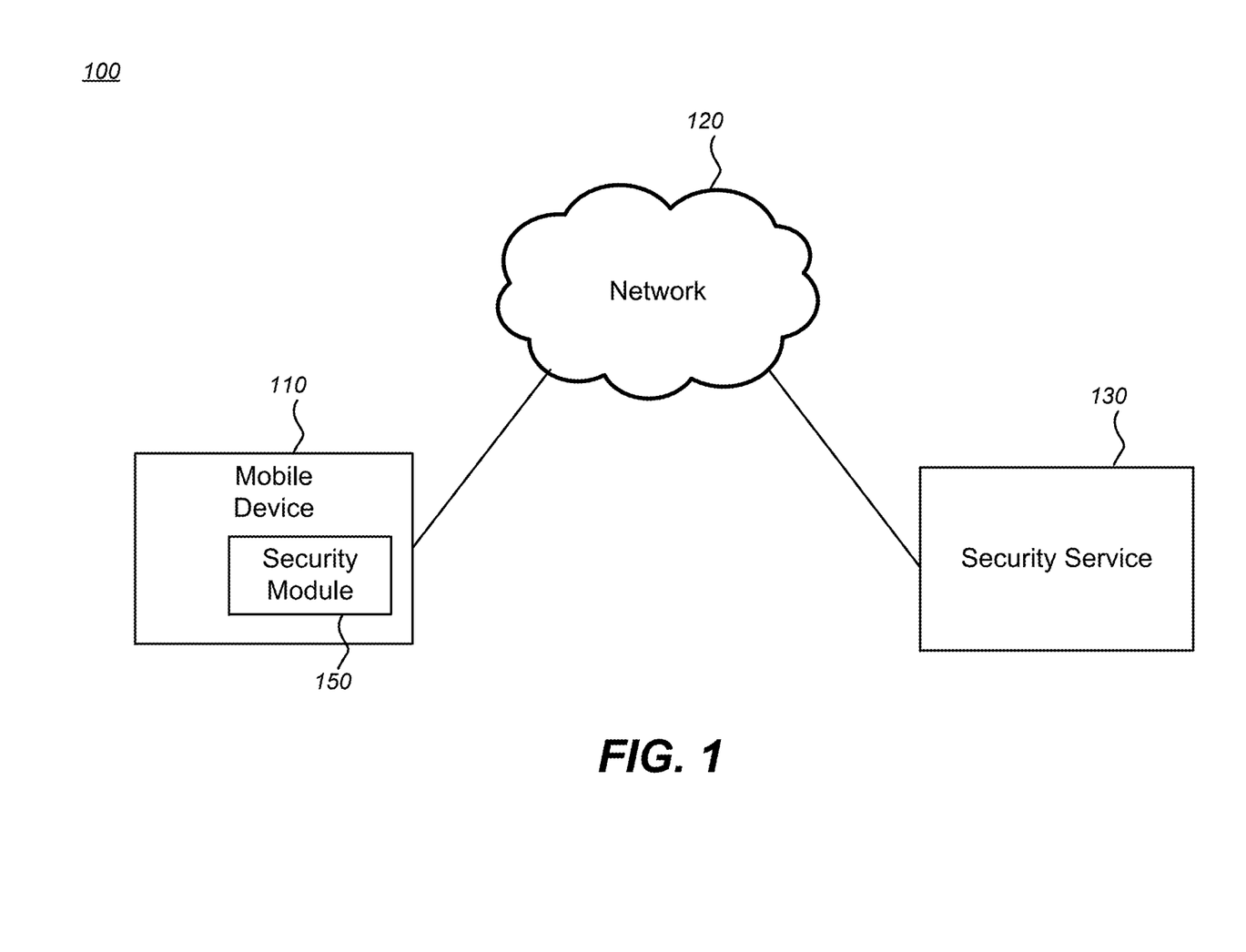
FIG. 1 illustrates one embodiment of a system environment including a mobile device with a security module, network and a security service.

FIG. 1 illustrates one embodiment of a system environment including a mobile device 110 with security module 150 installed thereon, network 120, and security service 130.

Network 120 may be any network, such as the Internet. In one embodiment, network 120 is the Internet and uses standard communications technologies and/or protocols. Thus, network 120 can include links using technologies such as Ethernet, 802.11, worldwide interoperability for microwave access (WiMAX), 3G, 4G, 5G, digital subscriber line (DSL), asynchronous transfer mode (ATM), InfiniBand, PCI Express Advanced Switching, etc. Similarly, the networking protocols used on network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 120 can be represented using technologies and/or formats including the hypertext markup language (HTML), the extensible markup language (XML), JavaScript Object Notation (JSON), etc. In addition, all or some of the links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Mobile device 110 may be any computing device capable of being carried by a human being, such as a smartphone, a tablet, a wearable computing device such as a smart watch, an Internet-of-Things (IoT) device, and the like. As the mobile device 110 performs various tasks and is exposed to various potential threats, the security module 150 analyzes activities ongoing on the mobile device 110 and identifies potential threats. Security module 150 performs this task by analyzing features of mobile applications and activities ongoing on the mobile device 110 and taking action where security risks are found (e.g., logging the encounter, alerting the user of device 110, etc.). Security module 150 may run in a virtual private network (VPN) that tracks network traffic. In one embodiment, mobile device 110 may have multiple-core processors and security module 150 may distribute multiple detection processes across multiple cores and run multiple detection processes concurrently.

In one embodiment, security module 150 may be embedded in a third-party application that is provided by a third-party application provider. A third-party application may need to ensure end-user security and therefore may have security module 150 integrated into the third-party application. For example, a security module 150 may be integrated into a third-party application such as a banking application or a corporation application to perform security functionalities on mobile device 110. In one embodiment, the third-party provider of the application that uses security module 150 may send instructions to security module 150 including rules to identify malicious activities. A third-party application provider may customize detection rules based on needs. For example, the third-party provider may have special requirements for detection, or the third-part application provider may be aware of detection logic that security service 130 is not aware of.

Security service 130 may provide security module 150 to mobile device 110 for installation and may store classifiers and data not suitable for storage on mobile device 110 (e.g., due to memory limitations on mobile device 110). Security service 130 may also identify new vulnerabilities for mobile device 110 and determine instructions to send to mobile device 110. While security service 130 is depicted as a single entity in environment 100, security service 130 may be distributed across multiple servers, and the functionality of security service 130 may, in whole or in part, be stored in mobile device 110 as part of security module 150. Further details about security service 130 are discussed below in accordance with FIG. 2.

Security Service Configuration

Figure 2:
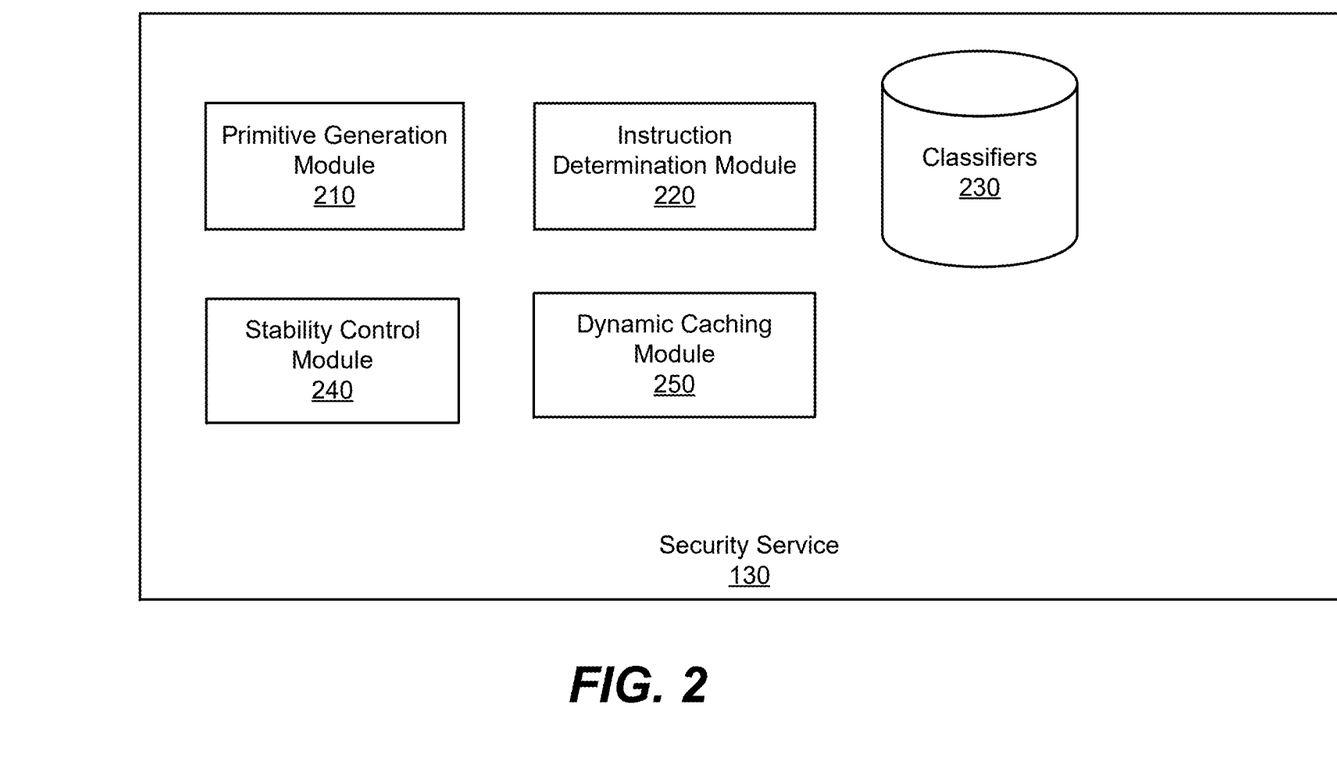
FIG. 2 illustrates one embodiment of exemplary sub-modules of a security service.

FIG. 2 illustrates one embodiment of exemplary submodules of a security service 130. Security service 130 includes a primitive generation module 210 that generates primitives, an instruction determination module 220 that determines instruction to chain a set of primitives, classifiers 230 that store classifiers, a stability control module 240 that controls compatibility between instructions and classifiers, and a dynamic caching determination module 250 that generates instructions for dynamically caching reusable information. In one embodiment, one or more of functionalities for the modules mentioned above may be instantiated and executed on security module 150 and thus performed local to mobile device 110. In another embodiment, one or more of functionalities for the modules may be executed on both a server (e.g. a server in security module 150) and mobile devices 110 and form a combination solution for detecting potential risk. Further details regarding security module 150 is discussed below in accordance with FIG. 3.

Primitive generation module 210 generates primitives. A primitive is a single piece of detection logic that is executable on mobile device 110 for monitoring activities on mobile device 110 and analyzing features of mobile applications. In one embodiment, the primitives may be used to analyze features and perform detection process for any type of devices, such as servers or devices and mobile devices 110. Each primitive, when executed, performs a piece of detection logic as a building block for a complicated process to detect potential malicious activities. In one embodiment, primitive generation module 210 may generate primitives based on instructions from a human. As each primitive is a piece of detection logic, a set of primitives may be chained together to form a more complicated logic and perform a more complicated detection task. Examples of primitives include but are not limited to: primitives that extract feature vectors, primitives that perform vector transformations, primitives that parse files, primitives that apply classifiers to data, etc.

Instruction determination module 220 may identify new vulnerabilities and determine instructions to send to mobile device 110. In one embodiment, instruction determination module 220 may discover a vulnerability based on analysis on data transmitted from a collection of mobile devices 110. For example, instruction determination module 220 may identify vulnerability by analyzing behaviors indicative of malicious activities and generate instructions based on instructions from a human. In another embodiment, instruction generation module 220 may download information such as new malware definitions or new malicious websites from network 120. The determined instructions specify primitives to chain together and how to chain the primitives together. In one embodiment, instruction determination module 220 may determine different instructions based on information associated with mobile device 110. Instruction determination module 220 may determine different instructions and different primitives to chain based on types and operating systems of mobile devices 110. For example, instruction determination module 220 may determine different instructions for a mobile device 110 with Android system and another mobile device with a different operating system. The instruction determination module 220 may send the instructions to security module 150 on mobile device 110, where the primitives may be chained together based on the instructions. In another embodiment, although instruction determination module 220 is illustrated as in security service 130, instruction determination module 220 may also be performed by security module 150. Further details regarding functionalities of the security module 150 are discussed below in accordance with FIG. 3.

Classifiers 230 stores classifiers for detecting a malicious activity. In the embodiment illustrated in FIG. 2, classifiers 230 is shown to be stored with in security service 130 for convenience, but classifiers 230 may be stored anywhere accessible via network 120. In one embodiment, classifiers 230 may include any classifier that may be applied by a machine learning algorithm to identify a malicious pattern from features extracted from mobile device 110. Classifiers 230 may also include blacklists or whitelists that indicate certain websites or portals are secure or malicious. Each classifier may be associated with a classifier version and different versions of classifiers may be used for different devices and different mobile applications. When security service 130 sends instructions to mobile device 110, classifiers with a version that is compatible with the instructions may be sent to mobile device 110 attached with the instructions, which ensures that the instructions are executed with the correct classifiers. Further detail is discussed in accordance with stability control and instruction sending module 240 below.

Stability control and instruction sending module 240 ensures compatibility between classifiers and instructions and sends instructions to mobile device 110. Stability control and instruction sending module 240 may maintain a version associated with each classifier and each instruction. When sending instructions to mobile device 110, stability control and instruction sending module 240 may attach the compatible version of a classifier to the instructions to ensure that the instructions are executed with the compatible classifiers. For example, different versions of classifiers may be required for different versions of the mobile application. Instead of the mobile device 110 downloading the classifiers from the security service 130 (or from other devices through network 120), the classifiers may be sent to mobile device 110 in conjunction with the instructions to ensure that the instructions are executed with correct classifiers.

Dynamic caching determination module 250 determines and sends instructions to security module 150 to dynamically cache reusable information. Dynamic caching determination module 250 may determine information to cache based on various factors. In one embodiment, dynamic caching determination module 250 may determine information to cache based on run time of a primitive. Dynamic caching determination module 250 may retrieve information associated with run time of detection process and primitives from mobile devices 110. Dynamic caching determination module 250 may determine to cache results for a primitive that takes a threshold of time to finish executing. If a primitive takes a relatively long period of time to run, dynamic caching determination module 250 may send instructions to store computed results of the primitive for future use. In another embodiment, dynamic caching determination module 250 may determine to cache extracted features for a mobile application. For example, dynamic caching determination module 250 may determine that a certain mobile application is associated with frequent application updates. Dynamic caching determination module 250 may instruct security module 130 to cache a set of extracted features from a current version of the mobile application. If the mobile application is updated to a new version, instead of performing a full extraction of feature vectors of the updated application, dynamic caching determination module 250 may instruct security module 130 to reuse the cached features that do not change from the prior version to reduce unnecessary computation. Caching reusable results to local devices may save computing power and therefore save batter energy consumed by security module 130.

Security Module Configuration

Figure 3:
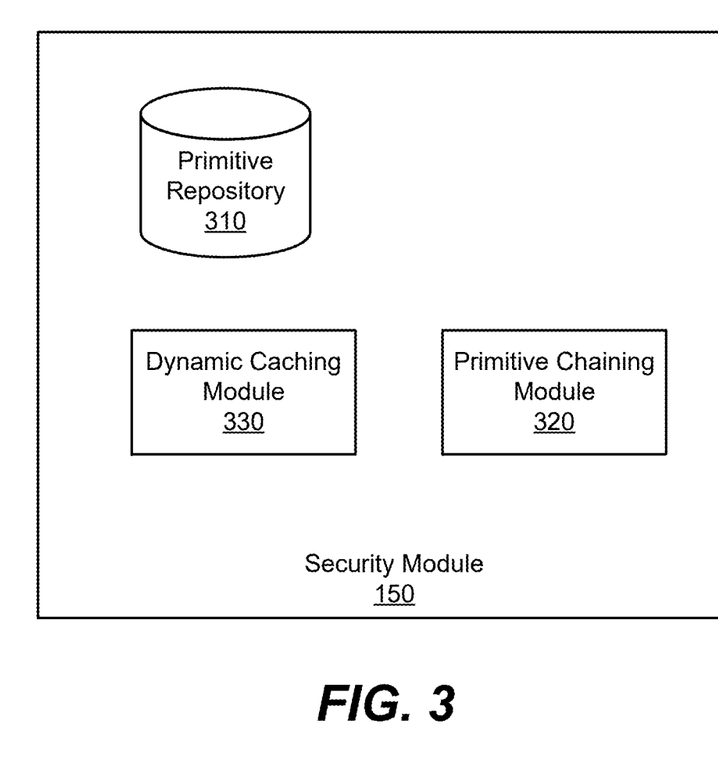
FIG. 3 illustrates one embodiment of exemplary sub-modules of a security module.

FIG. 3 illustrates one embodiment of exemplary sub-modules and database of a security module. Security module 150 includes a primitive repository 310 that stores primitives, a primitive chaining module 320 that chains primitives to form a detection logic, and a dynamic caching module 330 that caches and stores cached reusable information for future use. The modules and classifiers depicted with respect to security module 150 are exemplary; more or fewer modules and data may be used, consistent with the disclosure provided herein.

Primitive repository 310 stores a set of primitives received from security service 130. In one embodiment, because security module 150 is embedded into a mobile application, an update to primitive repository 310 requires a review process from a platform that maintains the mobile application. For example, if security service 130 needs to send a set of new primitives to primitive repository 310, the mobile application that the security module 150 is embedded on may need an application update, which requires a review process from a third-party platform such as Google Play App store. The review process often takes a period of time such as days or weeks. In one embodiment, primitives may be received and reviewed in advance such that when security module 150 receives instruction to chain a set of primitives for a detection process, the set of primitives are already reviewed and stored in primitive repository 310, which reduces the delay resulting from the period of time required by the review process.

Figure 4:
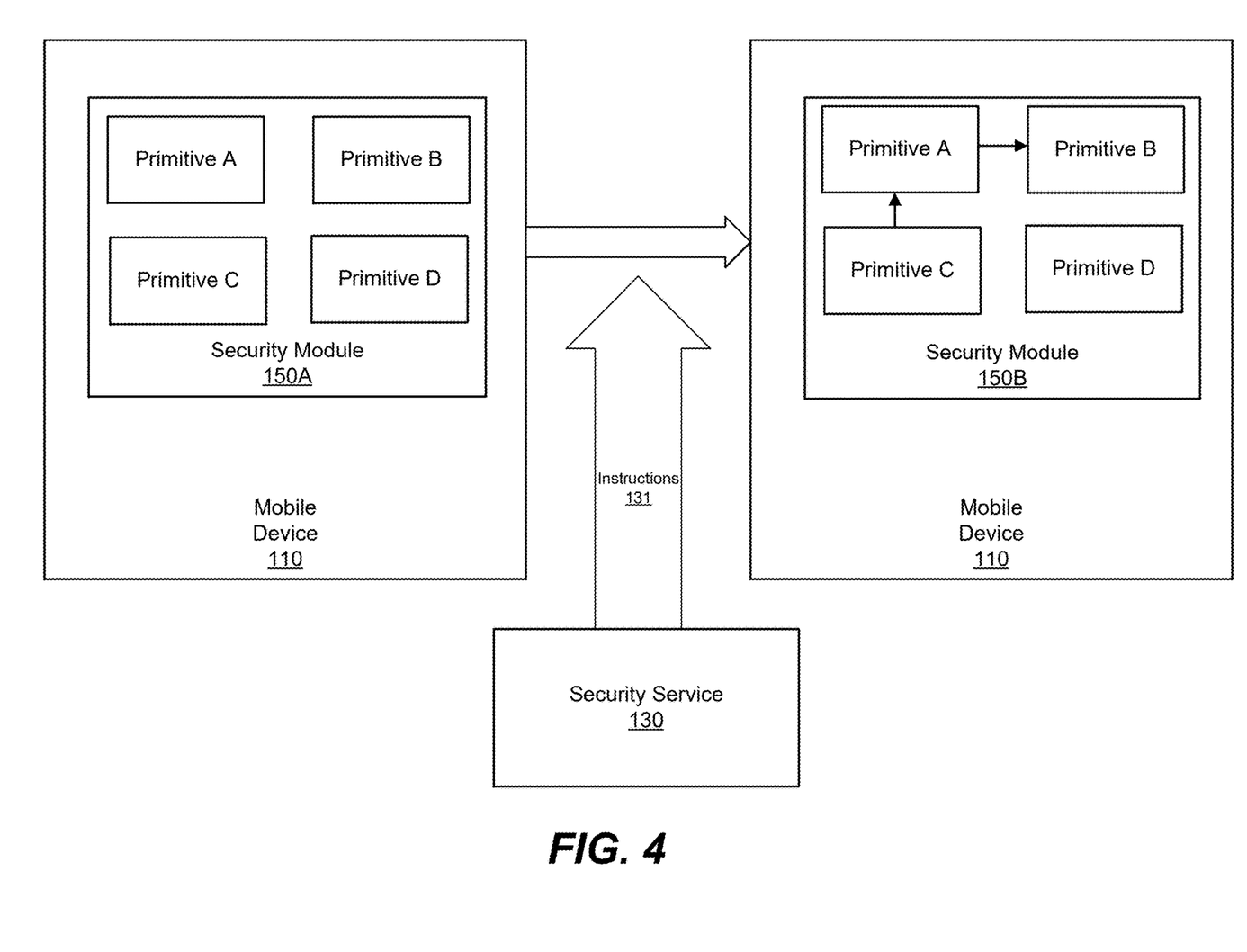
FIG. 4 illustrates one embodiment of exemplary process of dynamically chaining primitives for a detection process.

Primitive chaining module 320 chains primitives to form a detection process based on instructions received from security service 130. FIG. 4 illustrates an exemplary embodiment of primitive chaining. Referring to FIG. 4, mobile device 110 includes a security module 150A with primitives A-D stored in primitive repository 310. The primitives A-D do not require additional time resulting from a reviewing process by a third-party platform. Security service 130 may determine that a new vulnerability may cause mobile device 110 to expose to potential threats. Security service 130 may then send instructions 131 to security module 150A of mobile device 110, where the instructions 131 specify the primitives needed for the detection process and a way to chain the primitives. As illustrated in FIG. 4, the instructions 131 may specify that the detection process involves executing primitive C and feeding results outputted from primitive C to primitive A. Instructions 131 may further include using results from primitive A as input to primitive B. An example use case with a more specific context is further discussed below to illustrate this process.

For illustration purposes, the process in FIG. 4 may be applied on a detection process that involves a machine learning algorithm. For example, mobile device 110 may maintain a primitive repository 310 with a primitive A that extracts feature vectors from a mobile application, a primitive B that performs feature transformation, and a primitive C that applies a classifier to feature vectors and identifies malicious patterns. Responsive to detecting a new potential threat, security service 130 may send instructions to security module 150 to form a detection process such that primitives A, B and C need to be chained together. The instructions further specify that primitive A needs to be executed first. Outputs from primitive A (e.g. extracted feature vectors) are inputs for primitive B. Primitive B then performs vector transformation such as normalization, duplication removal, or dimension reduction to the feature vectors extracted from primitive A. Primitive B then outputs transformed feature vectors and primitive C may use the outputs from primitive B as data for applying a machine learning classifier. In one embodiment, the classifier used for the machine learning algorithm may be attached with the instructions received from security service 130 to ensure that the correct version of classifier is applied. As such, primitives A, B and C are chained together based on instructions received from security service 130 to form a detection process that identifies the new potential threat.

In an alternative embodiment, primitive chaining module 320 chains primitives based on instructions received from a third-party application provider. For example, a third-party application provider who is a user of security module 150 may have specific requirements for a detection process or the third-party application provider may be aware of detection logic that security service 130 is not aware of. The third-party application provider may customize detection logic and define rules, which are then combined with instructions received from security service 130. In one embodiment, customized instructions may override instructions received from security service. The combined instructions may then form a detection process and may be executed to detect potential threats.

In one embodiment, multiple detection processes such as the one illustrated in FIG. 4 may be combined to detect composite threats. A composite threat may be an amalgamation of a set of sub-threats. A combination of multiple detection processes may be referred to as a composite detection process. Security service 130 may generate a set of instructions regarding chaining a set of primitives for one detection process that targets a sub-threat of the set of sub-threats. Security service 130 may generate a set of instructions for each sub-threat and combine the various sets of instructions. The combined instructions form a composite detection process that targets the composite threats. In one embodiment, instructions for sub-threats are combined based on time differences between the sub-threats. For example, if threat B happens within a threshold of time interval following threat A, and threat C happens within the threshold of time interval following threat B, primitives for detecting threats A, B and C may be chained together as a composite detection. In another embodiment, a composite threat may be detected if a certain number of sub-threats in a chain are detected. For example, security service 130 may determine that a composite threat (comprising sub-threats A, B and C) is detected if two of the sub-threats A, B and C are detected. Based on the determination, primitive chaining module 320 may chain primitives that forms a composite detection process based on the composite threat. In some embodiments, primitive chaining module 320 may determine whether primitives for sub-threats may be chained to form a composite detection process based on various configuration parameters such as local network state.

Continuing with the discussion of FIG. 3, dynamic caching module 330 caches reusable information from one or more primitives and stores the cached information on mobile device 110. Dynamic caching module 330 caches information based on instructions received from dynamic caching determination module 250 of security service 130. The instructions may include which information to cache and may further include information regarding when to use cached information. Upon receiving instructions from security service 150, dynamic caching module 330 may retrieve relevant cached information and use the retrieved information in the detection process. Dynamic caching module 330 is further illustrated with an example use case below.

For illustration purposes, a detection process may involve parsing proc files, which are system files that contain operating information for processes currently running in an operating system (e.g. Linux system). To detect and analyze malicious activities, useful information and feature vectors may be extracted by parsing proc files. Instead of parsing the whole proc file every time a detection process is performed, dynamic caching module 330 may receive instructions from dynamic caching determination module 250 to cache certain structure and content of a proc file that do not change. Parsed results of the portion of a proc file that does not change may be cached to mobile device 110, and then the next time when the security module 130 needs to parse a proc file, the dynamic caching module 330 may retrieve and reuse the cached parts of parsed proc file to save computing power and battery energy.

Figure 5:
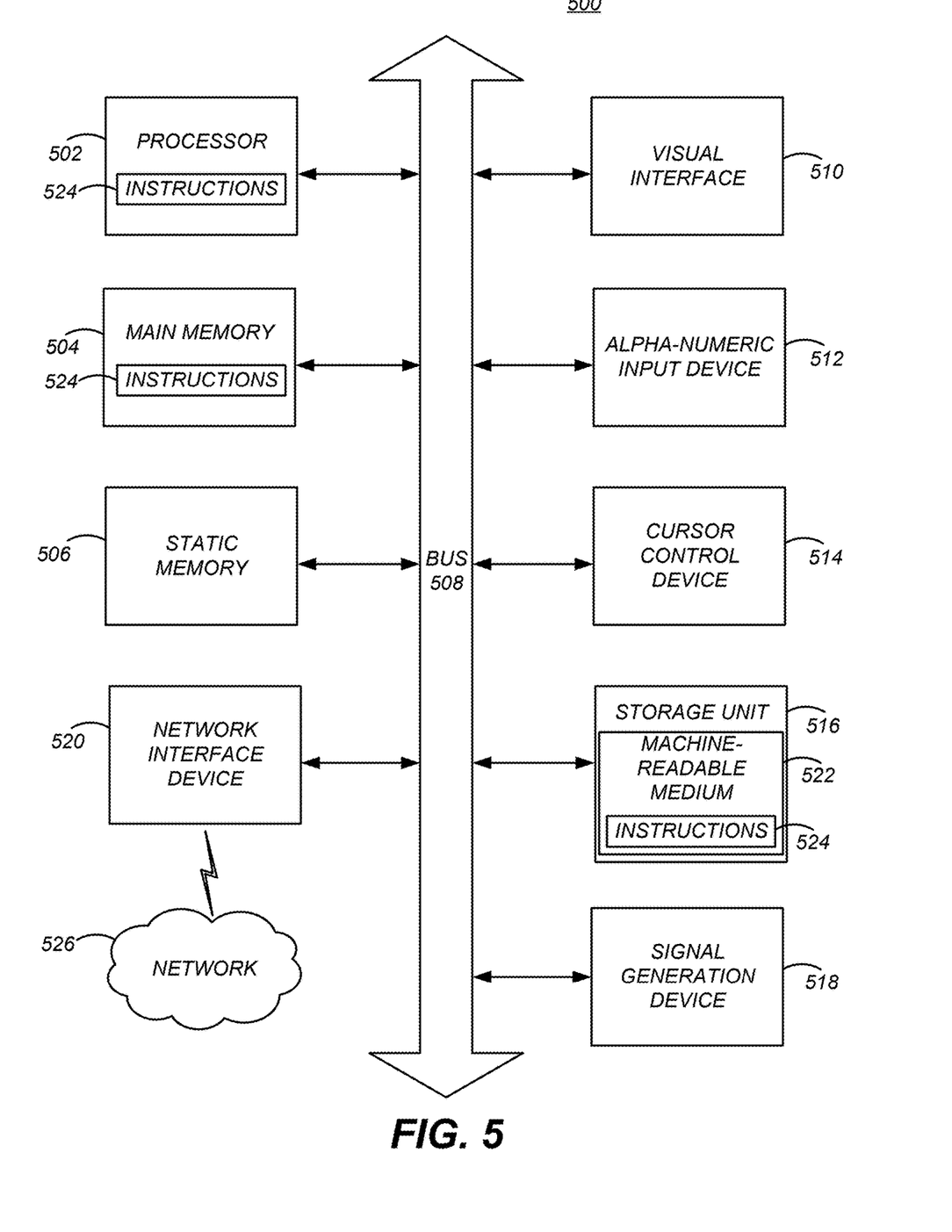
FIG. 5 is a block diagram illustrating components of an example machine able to read instructions from a machine-readable medium and execute them in a processor (or controller).

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a tablet, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Figure 6:
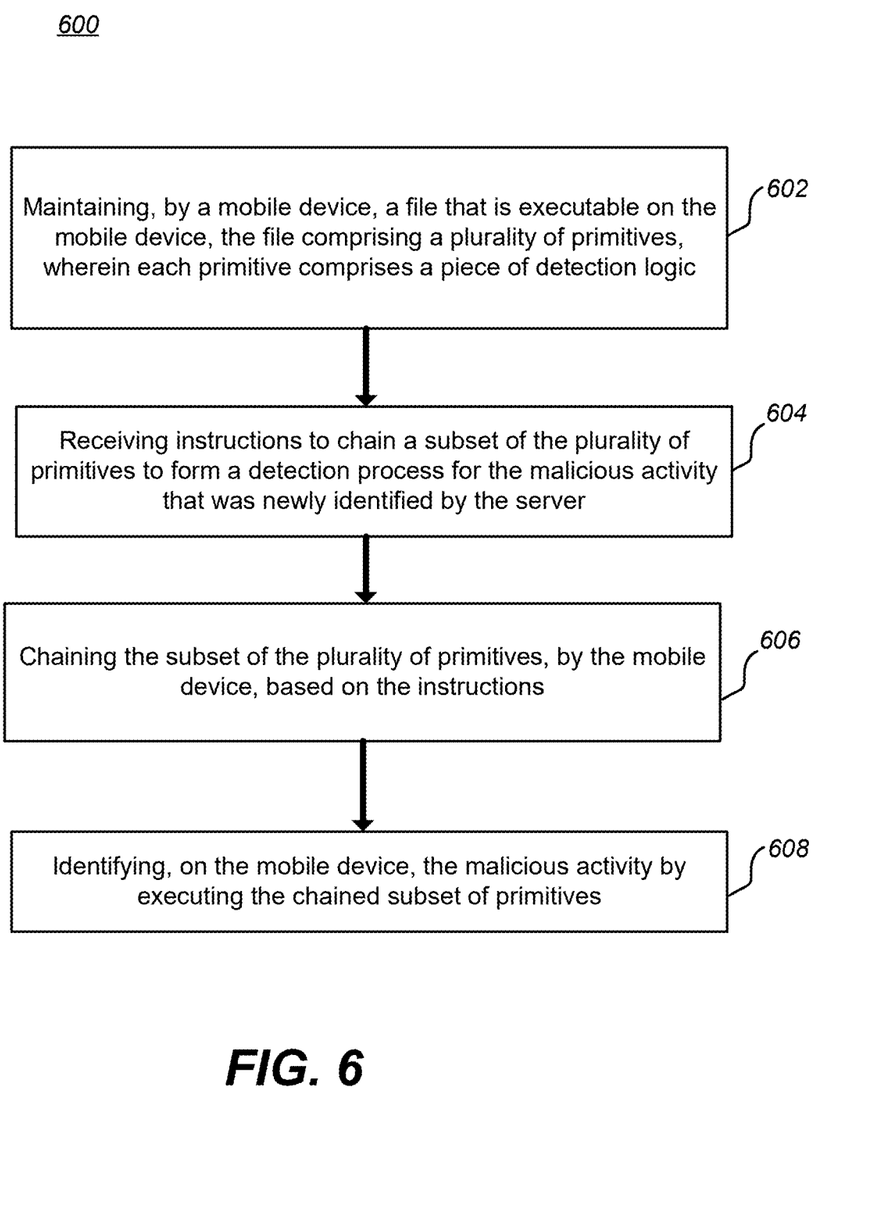
FIG. 6 illustrates one embodiment of a process for dynamically detecting a malicious activity.

FIG. 6 illustrates one exemplary embodiment of a process for dynamically detecting a malicious activity. In one embodiment, processor 502 of FIG. 5 is used in security service 130 to execute one or more modules depicted in FIG. 2 to perform process 600. Process 600 begins with a mobile device (e.g., mobile device 110) maintaining 602 a file that is executable on the mobile device. The file includes a plurality of primitives, with each primitive containing a piece of detection logic. The file, for example, may be maintained in primitive repository 310 in security module 150. Security module 150 then receives 604 instruction generated by instruction determination module 220 from security service 130 to chain a subset of the primitives to form a detection process that identifies a malicious activity, the malicious activity may include a risk of an attack to the mobile device. Primitive chaining module 320 of security module 150 chains 606 the subset of primitives based on the instructions received from security service 130. Primitive chaining module 320 in security module 150 then executes the chained subset of primitives and identifies the malicious activity.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for dynamically detecting malicious activities on mobile devices through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   maintaining, by a mobile device, a plurality of primitives, wherein each primitive comprises a piece of detection logic;
   receiving instructions, by the mobile device, from a server, to chain a subset of the plurality of primitives together, wherein the subset of primitives, when chained together, forms a detection process for a malicious activity, the malicious activity including a risk of an attack to the mobile device and identified based on activity relating to the risk performed by a plurality of mobile devices, the instructions received based on the server identifying a vulnerability of the mobile device to the malicious activity and transmitting an indication of the vulnerability to one or more of the plurality of mobile devices; and configuring the mobile device to detect the malicious activity by chaining the subset of the plurality of primitives based on the instructions.

2. The method of claim 1, wherein the malicious activity is associated with a mobile application on the mobile device, and wherein detecting the malicious activity does not require updating the mobile application.

3. The method of claim 1, further comprising:
receiving a second set of instructions that are defined by a provider of an application associated with the mobile device that is vulnerable to the malicious activity, wherein chaining the subset of the plurality of primitives is further based on the second set of instructions.

4. The method of claim 1, further comprising:
extracting a set of feature vectors based on data associated with the mobile device;
performing feature transformation to the set of feature vectors;
applying a classifier to the transformed set of feature vectors, wherein the classifier is received from the server or another device; and
determining the malicious activity based on results from running the classifier.

5. The method of claim 4, wherein the classifier is received in conjunction with the instructions from the server and wherein the classifier is compatible with the instructions.

6. The method of claim 4, further comprising:
storing the set of feature vectors on the mobile device, wherein the set of feature vectors is associated with a first version of a mobile application;
detecting an update to the mobile application to a second version; and
reusing a subset of the set of feature vectors in the detection process for the second version of the mobile application.

7. The method of claim 1, further comprising:
determining a runtime associated with each primitive of the subset of primitives;
storing results for one or more primitives of the subset of primitives based on the respective runtime; and
reusing the results for the one or more primitives in future detection process.

8. The method of claim 1, wherein chaining the subset of primitives is based on an operating system associated with the mobile device.

9. A non-transitory computer-readable storage medium storing executable computer instructions that, when executed by one or more processors, cause the one or more processors to perform operations, the instructions comprising instructions to:
maintain, by a mobile device, a plurality of primitives, wherein each primitive comprises a piece of detection logic;
receive instructions, by the mobile device, from a server, to chain a subset of the plurality of primitives together, wherein the subset of primitives, when chained together, forms a detection process for a malicious activity, the malicious activity including a risk of an attack to the mobile device and identified based on activity relating to the risk performed by a plurality of mobile devices, the instructions received based on the server identifying a vulnerability of the mobile device to the malicious activity and transmitting an indication of the vulnerability to one or more of the plurality of mobile devices; and configure the mobile device to detect the malicious activity by chaining the subset of the plurality of primitives based on the instructions.

10. The non-transitory computer-readable medium of claim 9, wherein the malicious activity is associated with a mobile application on the mobile device, and wherein detecting the malicious activity does not require updating the mobile application.

11. The non-transitory computer-readable medium of claim 9, the instructions further comprising instructions to:
receive a second set of instructions that are defined by a provider of an application associated with the mobile device that is vulnerable to the malicious activity, wherein chaining the subset of the plurality of primitives is further based on the second set of instructions.

12. The non-transitory computer-readable medium of claim 9, the instructions further comprising instructions to:
extract a set of feature vectors based on data associated with the mobile device;
perform feature transformation to the set of feature vectors;
apply a classifier to the transformed set of feature vectors, wherein the classifier is received from the server or another device; and
determine the malicious activity based on results from running the classifier.

13. The non-transitory computer-readable medium of claim 12, wherein the classifier is received in conjunction with the instructions from the server and wherein the classifier is compatible with the instructions.

14. The non-transitory computer-readable medium of claim 12, the instructions further comprising instructions to:
store the set of feature vectors on the mobile device, wherein the set of feature vectors is associated with a first version of a mobile application;
detect an update to the mobile application to a second version; and
reuse a subset of the set of feature vectors in the detection process for the second version of the mobile application.

15. The non-transitory computer-readable medium of claim 9, the instructions further comprising instructions to:
determine a runtime associated with each primitive of the subset of primitives;
store results for one or more primitives of the subset of primitives based on the respective runtime; and
reuse the results for the one or more primitives in future detection process.

16. The non-transitory computer-readable medium of claim 9, wherein chaining the subset of primitives is based on an operating system associated with the mobile device.

17. A system comprising:
memory with instructions encoded thereon; and
one or more processors that, when executing the instructions, are caused to perform operations comprising:
maintaining, by a mobile device, a plurality of primitives, wherein each primitive comprises a piece of detection logic;
receiving instructions, by the mobile device, from a server, to chain a subset of the plurality of primitives together, wherein the subset of primitives, when chained together, forms a detection process for a malicious activity, the malicious activity including a risk of an attack to the mobile device and identified based on activity relating to the risk performed by a plurality of mobile devices, the instructions received based on the server identifying a vulnerability of the mobile device to the malicious activity and transmitting an indication of the vulnerability to one or more of the plurality of mobile devices; and configuring the mobile device to detect the malicious activity by chaining the subset of the plurality of primitives based on the instructions.

18. The system of claim 17, wherein the malicious activity is associated with a mobile application on the mobile device, and wherein detecting the malicious activity does not require updating the mobile application.

19. The system of claim 17, the operations further comprising:

receiving a second set of instructions that are defined by a provider of an application associated with the mobile device that is vulnerable to the malicious activity, wherein chaining the subset of the plurality of primitives is further based on the second set of instructions.

20. The system of claim 17, the operations further comprising:

extracting a set of feature vectors based on data associated with the mobile device;

performing feature transformation to the set of feature vectors;

applying a classifier to the transformed set of feature vectors, wherein the classifier is received from the server or another device; and determining the malicious activity based on results from running the classifier.

* * * * *